(12) United States Patent
Bruce

(10) Patent No.: US 10,448,768 B2
(45) Date of Patent: Oct. 22, 2019

(54) BAR TOOL ASSEMBLY

(71) Applicant: Travis Bruce, Rockaway Park, NY (US)

(72) Inventor: Travis Bruce, Rockaway Park, NY (US)

(73) Assignee: GODINGER SILVER ART, LTD., Ridgewood, NY (US)

( * ) Notice: Subject to any disclaimer, the term of this patent is extended or adjusted under 35 U.S.C. 154(b) by 64 days.

(21) Appl. No.: 15/903,971

(22) Filed: Feb. 23, 2018

(65) Prior Publication Data
US 2019/0261792 A1    Aug. 29, 2019

(51) Int. Cl.
| | |
|---|---|
| *A47G 19/22* | (2006.01) |
| *A47J 43/07* | (2006.01) |
| *A47J 43/27* | (2006.01) |
| *A63H 17/26* | (2006.01) |
| *A47J 47/16* | (2006.01) |
| *A47J 43/28* | (2006.01) |

(52) U.S. Cl.
CPC ...... *A47G 19/2227* (2013.01); *A47J 43/0705* (2013.01); *A47J 43/27* (2013.01); *A47J 43/28* (2013.01); *A47J 43/284* (2013.01); *A47J 47/16* (2013.01); *A63H 17/266* (2013.01); *A47J 2043/0738* (2013.01)

(58) Field of Classification Search
CPC ..... A47G 19/2227; A47J 47/16; A47J 43/284; A47J 43/28; A47J 43/27; A47J 43/0705; A47J 2043/0738; A63H 17/266
See application file for complete search history.

(56) References Cited

U.S. PATENT DOCUMENTS

| | | | |
|---|---|---|---|
| D54,453 S | * | 2/1920 | Richardson ............ D12/1 |
| 1,725,265 A | | 8/1929 | Glendinning |
| D91,447 S | | 1/1934 | Wehrenberg |
| D128,417 S | | 2/1941 | Kimmel |
| D192,711 S | * | 5/1962 | Edelman ............... D34/18 |
| 3,731,428 A | | 5/1973 | Glass et al. |
| D232,133 S | | 7/1974 | Metzner et al. |
| 4,173,840 A | | 11/1979 | Fahrendorf et al. |
| 4,248,397 A | * | 2/1981 | Casper ............ A47G 23/0216 211/81 |
| D284,954 S | | 8/1986 | Lamb |
| D291,767 S | | 9/1987 | Osit |
| D301,532 S | * | 6/1989 | Holterscheidt ............ D7/624.1 |
| 5,389,031 A | | 2/1995 | Sharpe et al. |

(Continued)

*Primary Examiner* — Tony G Soohoo
(74) *Attorney, Agent, or Firm* — Cozen O'Connor

(57) ABSTRACT

A bar tool set and support platform. The platform module has a form factor and appearance of a partially disassembled replica of a riding vehicle such that the platform module has a seat tube and a head tube. At least one of the seat tube and the head tube has an open end defining a receiving space for receiving one or more of the bar tools. A wheel frame member is attached to one of the head tube and seat tube and defines a mounting region. At least a coaster or a strainer is configured for mounting to the mounting region. The bar tool has a corkscrew or container opener. The corkscrew has a corkscrew working end which can seat in the open end, and a handle end configured as handlebars positioned above the open end. When one of the coaster and strainer is received in the mounting region, the replica of the riding vehicle is substantially presented.

12 Claims, 4 Drawing Sheets

(56) References Cited

U.S. PATENT DOCUMENTS

| | | | |
|---|---|---|---|
| D390,415 S | 2/1998 | Hippen et al. | |
| D391,116 S | 2/1998 | Hippen et al. | |
| 5,873,763 A | 2/1999 | Morgan | |
| 5,979,850 A | 11/1999 | Hippen et al. | |
| D462,569 S | 9/2002 | Chin | |
| D511,930 S | 11/2005 | Wong | |
| D536,747 S * | 2/2007 | Barmes | D21/551 |
| D577,546 S | 9/2008 | Ferraby | |
| D579,271 S | 10/2008 | Ferraby | |
| D581,725 S | 12/2008 | Wong | |
| 7,686,501 B2 * | 3/2010 | Bruce | A47G 19/00 220/568 |
| 7,698,767 B2 * | 4/2010 | Clark, Jr. | A47J 19/023 7/155 |
| 9,107,543 B2 * | 8/2015 | Salles | B25F 1/04 |
| 2005/0106993 A1 | 5/2005 | Fosbenner et al. | |
| 2005/0155186 A1 | 7/2005 | McGuyer et al. | |
| 2007/0131118 A1 | 6/2007 | Bruce | |
| 2008/0173600 A1 * | 7/2008 | Mungal | A47G 23/02 211/71.01 |
| 2014/0231603 A1 * | 8/2014 | Holland | A47J 47/16 248/176.1 |

\* cited by examiner

BAR TOOL ASSEMBLY

BACKGROUND OF THE INVENTION

1. Field of the Invention

The present invention generally relates to equipment for beverage preparation and, in particular, to an assembly of bar tools useful for preparing mixed drinks such as cocktails.

2. Description of the Related Art

Commercial drinking establishments serving alcoholic beverages employ various types of decor or motifs, not only to distinguish themselves from one another, but also to enhance the experience of their patrons. Presumably this leads to at least certain patrons frequenting such bars more often and/or lingering for longer periods of time during such visits. As a consequence, patrons will spend more money. The decor can include the color of the walls, type of furniture, design of the "bar" itself, i.e. the table behind which a bartender prepares drinks for customers, as well as the design of the drinking glasses, dishes, and other accoutrements, all of which can enhance the appeal of an establishment. In such commercial establishments, the bar itself is often the focal point of the room.

In residences, bars are also the focal points of the rooms in which they are situated. Residence owners typically look for ways to enhance the entertainment value of their bars, such as from the decor, lighting, and the incorporation of games such as billiards. Such techniques, however, are costly and do not always result in the desired effect of increasing the novelty of the bar. Other techniques include the purchase of stylish drinking glasses, dishes, and certain bar ware items. In general, however, bar ware such as bar tool sets represent loose collections of individual components (e.g., shakers, ice tongs, bottle openers, jiggers and stirrers, etc.) used in mixing and serving drinks and cocktails. Such tools and items are difficult to keep organized, transfer between several serving positions such as locations along a bar countertop and, because they do not add any visual appeal from a novelty perspective, are oftentimes kept in drawers or otherwise out of view of guests. Although certain bar tool sets exist which have tools showing a common design, such sets also do not provide a certain novelty appeal and, hence, are usually stored out of view of guests.

Accordingly, there is a need for a bar tool set having a novelty and entertainment value.

SUMMARY OF THE INVENTION

The present invention generally relates to utensils such as tools for producing mixed drinks such as cocktails. In a first aspect of the present invention, there is provided a bar tool assembly comprising a platform module and a set of bar tools. The platform module is adapted for housing and supporting the bar tool set on a substantially flat surface, such as a bar top, a counter, and the like. The platform module has a form factor and appearance of a replica of a partially disassembled consumer or industrial product, and at least one of the bar tools of that set has a form factor and appearance of at least one removed portion of that product. The platform module having at least one bar tool from the bar tool set disposed on itself attains the form factor and appearance of the replica of the assembled consumer or industrial product.

In a second aspect of the present invention, the consumer product is a vehicle such as a bicycle, motorcycle, tricycle or the like, namely, a riding vehicle having handlebars and wheels. In one embodiment, the bar tool set comprises a cork screw, a bottle opener, a jigger, stirrers or condiment picks and a strainer or coasters which comprise the wheels of the vehicle, with each of the bar tools having a form factor and appearance of a component of the vehicle's components.

In particular, a platform module adapted for housing a bar tool set on a substantially flat surface is disclosed. The platform module has a form factor and appearance of a partially disassembled replica of a riding vehicle such that the platform module has a seat tube and a head tube. At least one of the seat tube and the head tube has an open end defining a receiving space therein, and at least one wheel frame member attached to one of the head tube and seat tube and defining a mounting region. At least one of a coaster and a strainer configured for removable mounting to the mounting region of the wheel frame member. The bar tool set further comprises one of a corkscrew and a container opener, the corkscrew having a corkscrew working end configured for removable engagement with the open end, and a handle end configured as one of a seat and handlebars positioned above the open end when the working end is received in the open end. The container opener has a stem configured for removable engagement with the open end, and a container opener working end configured as the other one of the seat and handlebars positioned above the open end when the stem is received in the open end. When the at least one of the coaster and strainer is received in the mounting region, the replica of the riding vehicle is substantially presented.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The teachings of the present invention will become apparent by considering the following detailed description in conjunction with the accompanying drawings, in which.

DETAILED DESCRIPTION OF THE PRESENTLY PREFERRED EMBODIMENTS

The present invention generally relates to bar equipment for producing and/or serving mixed drinks, e.g. cocktails. Such mixed drinks are made according to recipes which require predetermined quantities (volumes) of mixed and/or stirred compositions of component bottled alcoholic and non-alcoholic beverages, with or without non-liquid additives (e.g., temperature regulating additives such as ice cubes, taste-modulating additives such as spices, fresh or preserved fruits, and the like).

Figure 1:
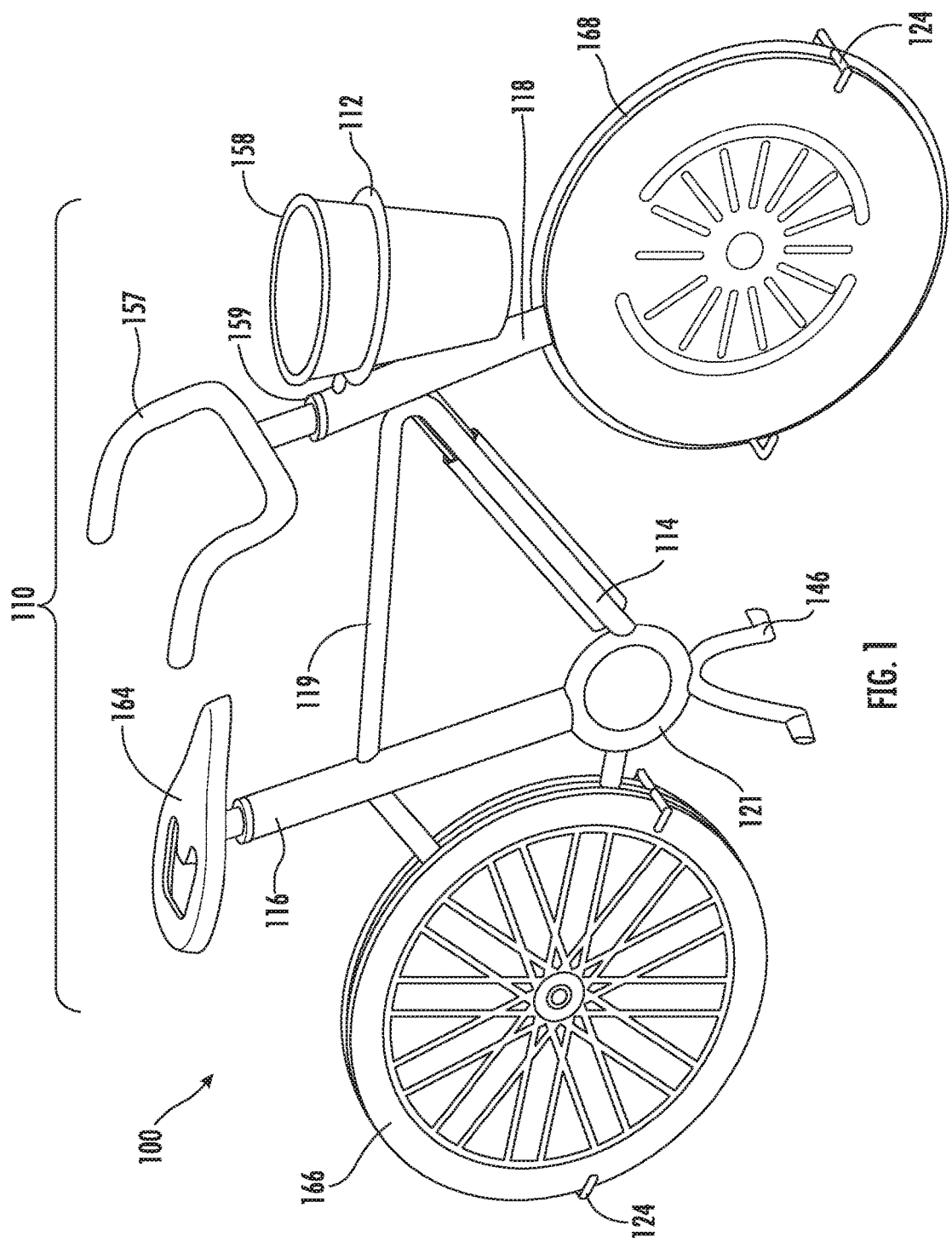
FIG. 1 depicts a right-side perspective view of an exemplary bar tool assembly having a form factor and appearance of a bicycle having bar tools forming components of the form factor bicycle, in accordance with one embodiment of the present invention.
Figure 2:
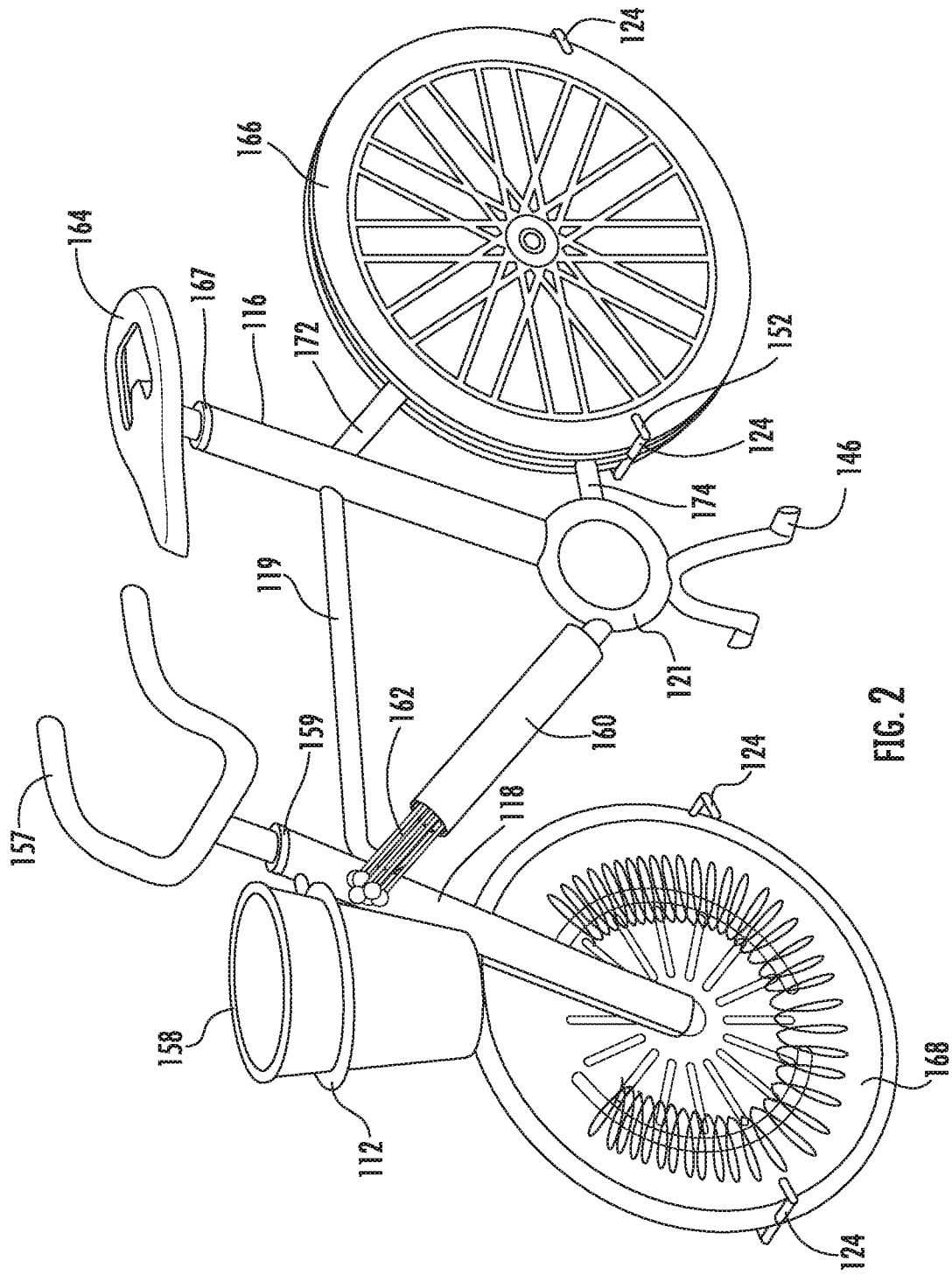
FIG. 2 depicts a left-side perspective view of the assembly of FIG. 1.

FIGS. 1 and 2 depict left-side and right-side views, respectively, of an exemplary bar tool assembly 100 of the kind that may be used to practice the invention. Herein, similar devices are identified using the same numeric references. The bar tool assembly 100 generally comprises a bar tool set 110 and a platform module 120 configured as a frame of a riding vehicle, such as a bicycle, tricycle, motorcycle, or the like. The platform module 120 is adapted for housing and supporting the bar tool set 110 on a substantially flat surface (not shown).

Figure 3:
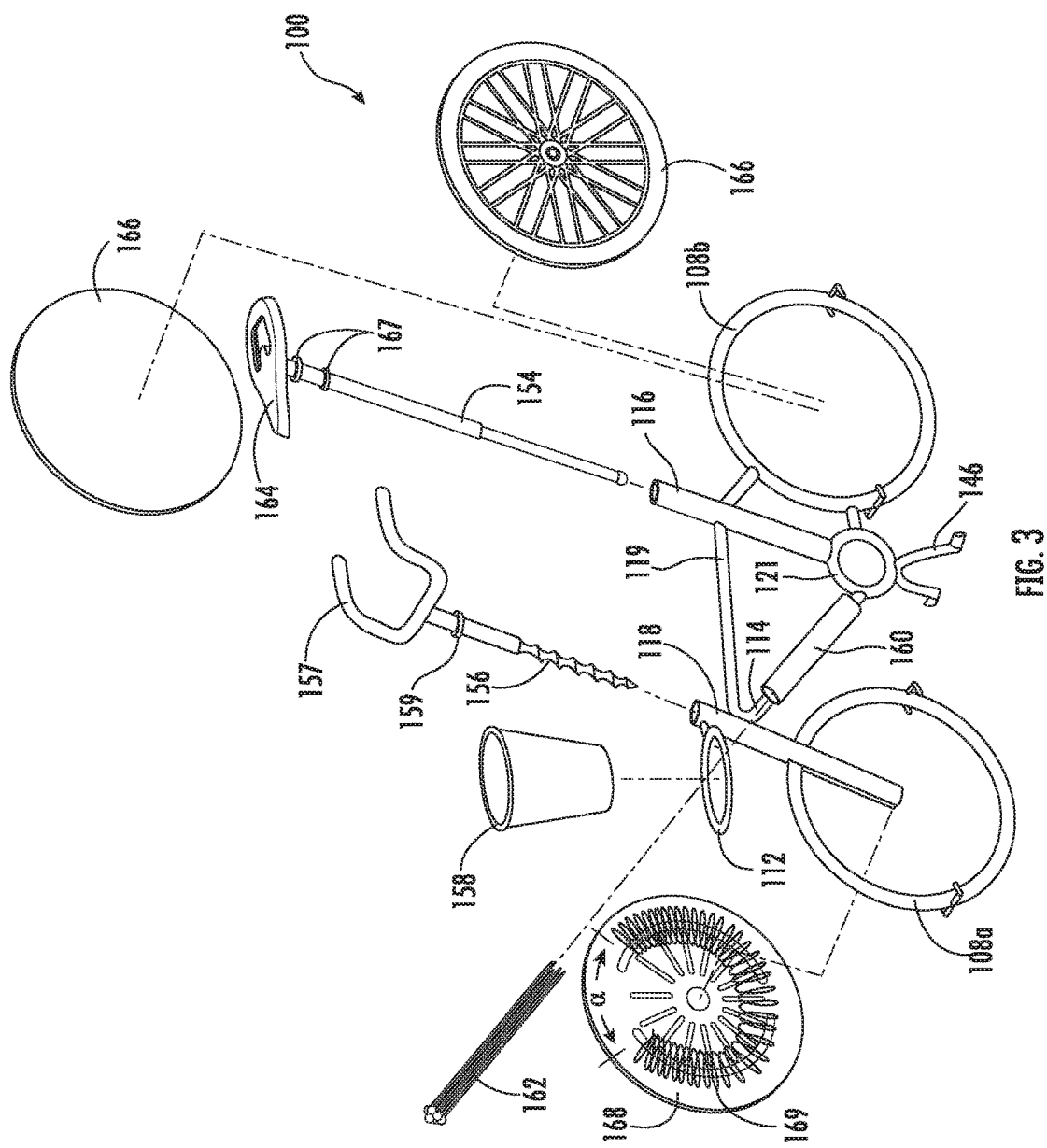
FIG. 3 depicts the various components of the bar tool assembly, including a platform module.
Figure 4:
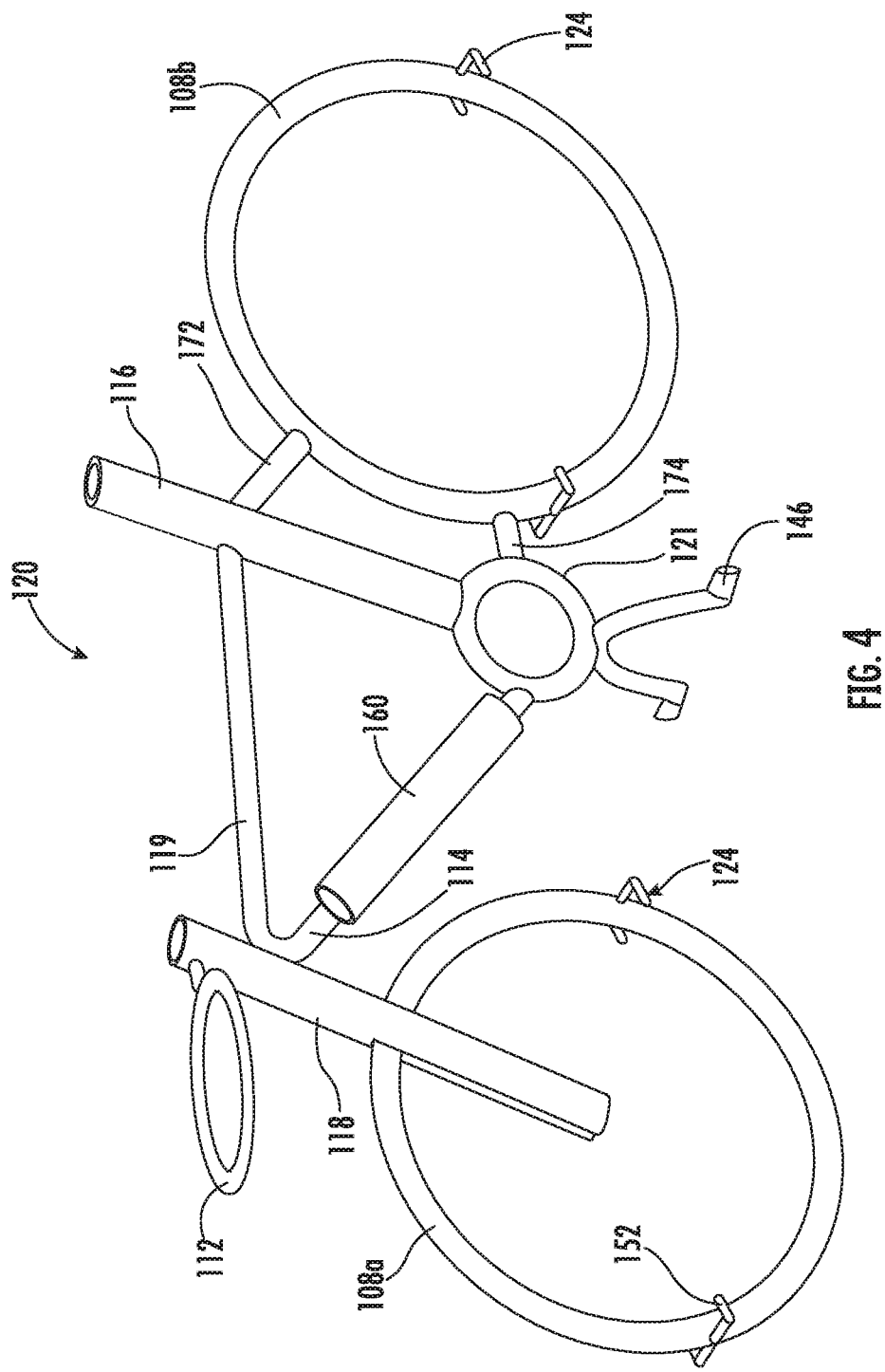
FIG. 4 depicts a left-side perspective view of the platform module.

In the depicted embodiment, the platform module 120 is configured as a bicycle frame having a downtube 114, a seat tube 116, a top tube 119, and a head tube 118 to which a support loop 112 is attached. The seat tube 116 and head tube 118 are hollow and each has an open end as best depicted in FIG. 3.

The platform/frame 120 also includes a plurality of round frame members resembling wheel frames, including at least one front wheel frame 108a and at least one rear wheel frame 108b. The wheel frames are substantially circular and have securing means 124 configured as retaining brackets having hooked ends 152 for securing components thereto, as explained below.

The bar tool set 110 includes a plurality of bar tools such as a cork screw 156. At least one, and preferably all, of the bar tools have a form factor and appearance of a portion or component of the riding vehicle such that when at least one or more of the bar tools are supported on the platform in their intended manner, an overall form factor (e.g., bicycle, etc.) is complete. Components of the bar tool set 110, namely, the individual tools, are detachably mounted on the platform module 120, as explained below, for easy removal, use, and return.

When certain ones of the bar tools of the bar tool set 110 are mounted to the platform module 120, the bar tool assembly 100 has a form factor and appearance of a replica of the riding vehicle. Correspondingly, when the certain ones of the bar tools are removed from the platform module 120, the bar tool assembly 100 resembles a partially disassembled replica of the riding vehicle.

Individual components of the bar tool assembly 100 may be formed from plastics, metals, composites, and like materials or combination thereof. At least external (i.e., viewable) surfaces of the components may by painted, coated, or otherwise treated to resemble the respective portions and characteristic details and/or markings of the replica (e.g., artwork or branding associated with a bicycle or motorcycle, etc.). Preferably, the individual bar tools are made of a washable material.

With continued reference to the figures, the downtube 114 and seat tube 116 connect to a support member 121, which is in turn connected to a stand 146 configured for facilitating the positioning of the assembly 100 on a flat surface such as a table. The front wheel support frame 108a is connected to the head tube 118 and defines a mounting location for a disc-shaped bar tool, such as one of a coaster 166 or a strainer 168. The rear wheel support frame 108b is connected the seat tube 116 via a seat tube connection member 172, and to the support member 121 via a support member connection 174. Elements 114, 116, 118, 119, 121, 172 and 174 may be unitarily molded from a single piece of material, such as metal or plastic, or welded together, as in the case of metal components, or attached in any other way known in the art.

The brackets 124 are affixed to the wheel support frames 108a and 108b at positions less than 180 degrees apart with respect to a horizontal diameter of the frames. In the figures, the brackets are mounted at opposite positions and separated by an approximate 120 degree arc below the diameter. The brackets extend outward from either side of the wheel frames and into the hooked ends 152 to provide mounting spaces for accommodating insertion of one or more disc-shaped bar tools.

In the figures, the rear wheel support frame 108b accommodates one or more coasters 166 which, preferably, are formed to resemble a bicycle wheel having a hub and spokes. The coasters 166 are positioned behind the hooks by inserting them in the mounting space in a downward motion such that a first coaster is positioned on one side of the wheel support frame and a second coaster is positioned on the other side of the wheel support frame. The hooks 152 maintain the coasters in a substantially vertical orientation. In FIGS. 1 and 2 two coasters are shown, whereas FIG. 3 shows a single coaster. The front wheel support frame 108a also has brackets 124 positioned at locations along wheel support frame 108a similar to the locations along member 108b, to also accommodate insertion of a disc-shaped bar tool 168, configured as a beverage strainer of the type commonly positioned over a mouth of a cocktail shaker, as is known in the art. The strainer has openings therethrough to allow strained liquid to flow, with one surface being planar, and an opposite surface containing a spring member 169 for releasable attachment to the shaker (not shown) for straining a beverage. The spring member 169 extends in an arcuate configuration but has a separation arc "a" to provide a receiving space for a portion of the head tube 118 when the strainer 168 is mounted to the front wheel member 108a.

Although the figures depict the strainer 168 mounted to the front wheel member 108a and the coasters 166 mounted to the rear wheel member 108b, the opposite arrangement can be readily obtained without departing from the scope of the invention.

The barware set also includes the corkscrew 156 having a grasping portion configured as handlebars 157 for the platform 120 and a working end which engages a cork, as is known in the art. The head tube 118 is hollow to accommodate insertion of the corkscrew portion 156 therein as shown in FIG. 2 such that the handlebars are positioned above the mouth of the tube 118. A spacer 159 is also provided between the corkscrew 156 and the handlebars 157 and which has a diameter slightly larger than that of the mouth of the head tube 118 to position the handlebars in an intended manner, as shown in FIGS. 1 and 2.

The barware set further includes a container opener, such as a can or bottle opener having a working end 164 configured as a bicycle seat, and having a stem 154 dimensioned for insertion into the open end of the seat tube 116, and include one or more spacers 167, which serve similar functions to spacer 159, to position the bike seat-shaped bottle opener above the seat tube 116 as shown in FIGS. 1 and 2. The stem 154 may also be used as a cocktail stirrer when it is removed from tube 116. In a preferred embodiment, the stem may be capable of telescoping, such as by having a narrower diameter portion extending out of and into a wider portion, as shown in FIG. 3.

A measuring cup such as a jigger 158 is also provided. Preferable, the jigger has an inwardly tapered side wall for seating within the support loop 112. Alternatively, the jigger may have a constant side wall to slide into the support loop and be supported thereby by a wide lip on the jigger. Lastly, the bar tool set may further include a hollow tube opened at one end and mounted to the downtube 114 to serve as a quiver 160 for receiving one or more cocktail condiment picks 162. The quiver may be in the shape of, or resemble, a bicycle water bottle or air pump, and the picks can also be configured to follow the overall bicycle motif (e.g., a straight portion of a bicycle chain, etc.)

As will be appreciated from the foregoing and the drawings, each of the bar tools is preferably configured to resemble a component to compliment a theme of the platform 120. Thus, a bicycle frame configured platform will have one or more disc-shaped bar tools, such as coasters and a strainer to complete or add a component to the overall bicycle design. Other tools can likewise add additional components such as the bicycle handle corkscrew or bicycle seat bottle opener. Thus, once the various tools are in place on the frame 120, a complete form is presented to the viewer, such as a complete bicycle having wheels, handlebars and a seat.

It should be appreciated that although the above-described embodiment shows a handlebar configured corkscrew and a bottle opener seat with stirrer, other configurations are easily realized. For example, the stirrer 154 on the bottle opener 164 could likewise be positioned below the handlebars 57, and the corkscrew 156 on the handlebars could be positioned below the bottle opener. Still other combination will be readily realized by those of ordinary skill.

As should be readily apparent from the figures, the coaster(s) 166 and strainer 168 comprise a portion of the overall "body" of the assembly 100, i.e. a portion of the bicycle. Thus, when the coaster and strainer are in their intended positions on the supports 108a and 108b of the frame 120, the consumer product, namely, the bicycle replica, has a substantially complete appearance, and when either the coaster(s) 166 and/or strainer 168 is removed from the frame 120, the bicycle replica has an incomplete appearance. As a result of the separable components of the assembly 100, with one or more of the components comprising a portion of the overall assembly and all or most of the components designed with a common theme that is related or otherwise associated with the design or theme of the platform frame 120, a bar tool assembly is provided having a unique entertainment and novelty value.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A bar tool assembly, comprising:
a platform module adapted for housing a bar tool set on a substantially flat surface, the platform module having a form factor and appearance of a partially disassembled replica of a riding vehicle, the platform module having a seat tube and a head tube, at least one of the seat tube and the head tube having an open end and defining a receiving space therein, and at least one wheel frame member attached to one of the head tube and seat tube and defining a mounting region;
at least one of a coaster and a strainer configured for removable mounting to the mounting region of the wheel frame member; and
at least one of a corkscrew and a container opener, the corkscrew having a corkscrew working end configured for removable engagement with the open end, and a handle end configured as one of a seat and handlebars positioned above the open end when the working end is received in the open end, the container opener having a stem configured for removable engagement with the open end, and a container opener working end configured as the other one of the seat and handlebars positioned above the open end when the stem is received in the open end, wherein, when the at least one of the coaster and strainer is received in the mounting region, the replica of the riding vehicle is substantially presented.
2. The assembly of claim 1, wherein the seat tube has the open end for receiving the stem of the container opener.
3. The assembly of claim 1, wherein the head tube has the open end for receiving the working end of the corkscrew.
4. The assembly of claim 1, wherein at least one wheel frame member comprises a front wheel frame member and a rear wheel frame member, and wherein each wheel frame member has at least one mounting region.
5. The assembly of claim 4, wherein the strainer is removably mounted to the mounting region of the front wheel frame member.
6. The assembly of claim 5, wherein the front wheel frame member is directly attached to the head tube, and the rear wheel frame member is indirectly attached to the seat tube.
7. The assembly of claim 4, wherein each mounting region is defined at least in part by a plurality of brackets attached to the wheel frame member and extending out the word therefrom.
8. The assembly of claim 2, wherein the coaster is removably mounted to the mounting region of the rear wheel frame member.
9. The assembly of claim 2, wherein the rear wheel frame member comprises two mounting regions, one on either side of the rear wheel frame member, and wherein the coaster comprises two coasters, each one removably mounted to a respective one of the mounting regions of the rear wheel frame member.
10. The assembly of claim 1, wherein the mounting region is defined at least in part by a plurality of brackets attached to the wheel frame member and extending out the word therefrom.
11. The assembly of claim 1, further comprising a support loop attached to the head tube and defining a receiving area, and a jigger removably receivable in the receiving area.
12. The assembly of claim 1, further comprising a down the tube attached at an end to the head tube, the down tube supporting a holder.

* * * * *